United States Patent
Chang et al.

(10) Patent No.: US 10,802,720 B2
(45) Date of Patent: *Oct. 13, 2020

(54) MODE-DETECTION METHOD FOR A STORAGE DEVICE

(71) Applicant: Silicon Motion, Inc., Jhubei (TW)

(72) Inventors: Chin-Pang Chang, Hsinchu (TW); Chun-Yi Lo, New Taipei (TW)

(73) Assignee: Silicon Motion, Inc., Jhubei (TW)

( * ) Notice: Subject to any disclaimer, the term of this patent is extended or adjusted under 35 U.S.C. 154(b) by 223 days.

This patent is subject to a terminal disclaimer.

(21) Appl. No.: 16/190,994

(22) Filed: Nov. 14, 2018

(65) Prior Publication Data
US 2019/0079673 A1    Mar. 14, 2019

Related U.S. Application Data

(63) Continuation of application No. 15/434,927, filed on Feb. 16, 2017, now Pat. No. 10,162,532, which is a continuation of application No. 14/504,014, filed on Oct. 1, 2014, now Pat. No. 9,612,610.

(30) Foreign Application Priority Data

Dec. 9, 2013   (TW) .............................. 102145064 A

(51) Int. Cl.
G06F 3/06       (2006.01)
G06F 12/02      (2006.01)
G06F 1/08       (2006.01)
G06F 1/12       (2006.01)
G06F 1/04       (2006.01)

(52) U.S. Cl.
CPC ................ G06F 3/061 (2013.01); G06F 1/04 (2013.01); G06F 1/08 (2013.01); G06F 1/12 (2013.01); G06F 3/0653 (2013.01); G06F 3/0679 (2013.01); G06F 12/0246 (2013.01); G06F 2212/7208 (2013.01)

(58) Field of Classification Search
None
See application file for complete search history.

(56) References Cited

U.S. PATENT DOCUMENTS 6,026,465 A *   2/2000  Mills ................... G06F 12/0607
                                                    711/103
2005/0169091 A1*  8/2005  Miki .................... G11C 11/406
                                                    365/230.03

(Continued)

*Primary Examiner* — Charles Rones
*Assistant Examiner* — Hewy H Li
(74) *Attorney, Agent, or Firm* — Wang Law Firm, Inc.

(57) ABSTRACT

A data storage device including a flash memory and a controller. The controller enables the flash memory to transmit a predetermined parameter stored in the flash memory according to a first predetermined trigger edge of a clock signal and reads the predetermined parameter transmitted by the flash memory according to the first predetermined trigger edge of the clock signal to obtain a first reference parameter in an asynchronous mode. The controller enables the flash memory to switch to a synchronous mode and transmit the predetermined parameter and reads the predetermined parameter transmitted by the flash memory according to the first predetermined trigger edge of the clock signal to obtain a second reference parameter in a detection mode.

12 Claims, 10 Drawing Sheets

(56) References Cited

U.S. PATENT DOCUMENTS

| | | | | |
|---|---|---|---|---|
| 2009/0300237 A1* | 12/2009 | Nobunaga | ............ | G06F 13/1694 |
| | | | | 710/61 |
| 2013/0318285 A1* | 11/2013 | Pignatelli | ............ | G06F 12/0246 |
| | | | | 711/103 |
| 2015/0016191 A1* | 1/2015 | Tsai | ................. | G11C 29/12015 |
| | | | | 365/185.18 |

* cited by examiner

MODE-DETECTION METHOD FOR A STORAGE DEVICE

CROSS REFERENCE TO RELATED APPLICATIONS

This Application is a continuation of U.S. application Ser. No. 15/434,927, filed on Feb. 16, 2017, which is a continuation of U.S. application Ser. No. 14/504,014, filed on Oct. 1, 2014, which claims priority to Taiwan Patent Application No. 102145064 filed on Dec. 9, 2013, the entirety of which are incorporated by reference herein.

BACKGROUND OF THE INVENTION

Field of the Invention

The present invention relates to a mode-detection method applied to a memory device, and in particular to a synchronous mode-detection method.

Description of the Related Art

Flash memory is considered a non-volatile data storage device, using electrical methods to erase and program itself. Taking NAND Flash as an example, it is often used in memory cards, USB flash devices, solid state devices, emmc, and other uses.

On the market, there are many types of access methods. However, some of the manufacturers do not inform retailers which modes are supported by the flash memory, such that the retailers cannot maximize the performance of the flash memory.

BRIEF SUMMARY OF THE INVENTION

A detailed description is given in the following embodiments with reference to the accompanying drawings.

The present invention provides a data storage device capable of operating in an asynchronous mode and a detection mode. The data storage device includes a flash memory and a controller. The flash memory is arranged to store a predetermined parameter. In the asynchronous mode, the controller is arranged to enable the flash memory to transmit the predetermined parameter according a first predetermined trigger edge of a clock signal and read the predetermined parameter transmitted by the flash memory according to the first predetermined trigger edge of the clock signal to obtain a first reference parameter. In the detection mode, the flash memory is further arranged to enable the flash memory to switch to a synchronous mode and transmit the predetermined parameter and read the predetermined parameter transmitted by the flash memory according to the first predetermined trigger edge of the clock signal to obtain a second reference parameter. Moreover, the controller is further arranged to compare the first reference parameter with the second reference parameter for determining whether the flash memory supports the synchronous mode.

The present invention further provides a mode-detection method applied to a data storage device capable of operating in an asynchronous mode and a detection mode, including: enabling a flash memory of the data storage device to transmit a predetermined parameter stored in the flash memory according a first predetermined trigger edge of a clock signal in the asynchronous mode; reading the predetermined parameter transmitted by the flash memory according to the first predetermined trigger edge of the clock signal to obtain a first reference parameter in the asynchronous mode; enabling the flash memory to switch to a synchronous mode and transmit the predetermined parameter in the detection mode; reading the predetermined parameter transmitted by the flash memory according to the first predetermined trigger edge of the clock signal to obtain a second reference parameter in the detection mode; and comparing the first reference parameter with the second reference parameter for determining whether the flash memory supports the synchronous mode.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
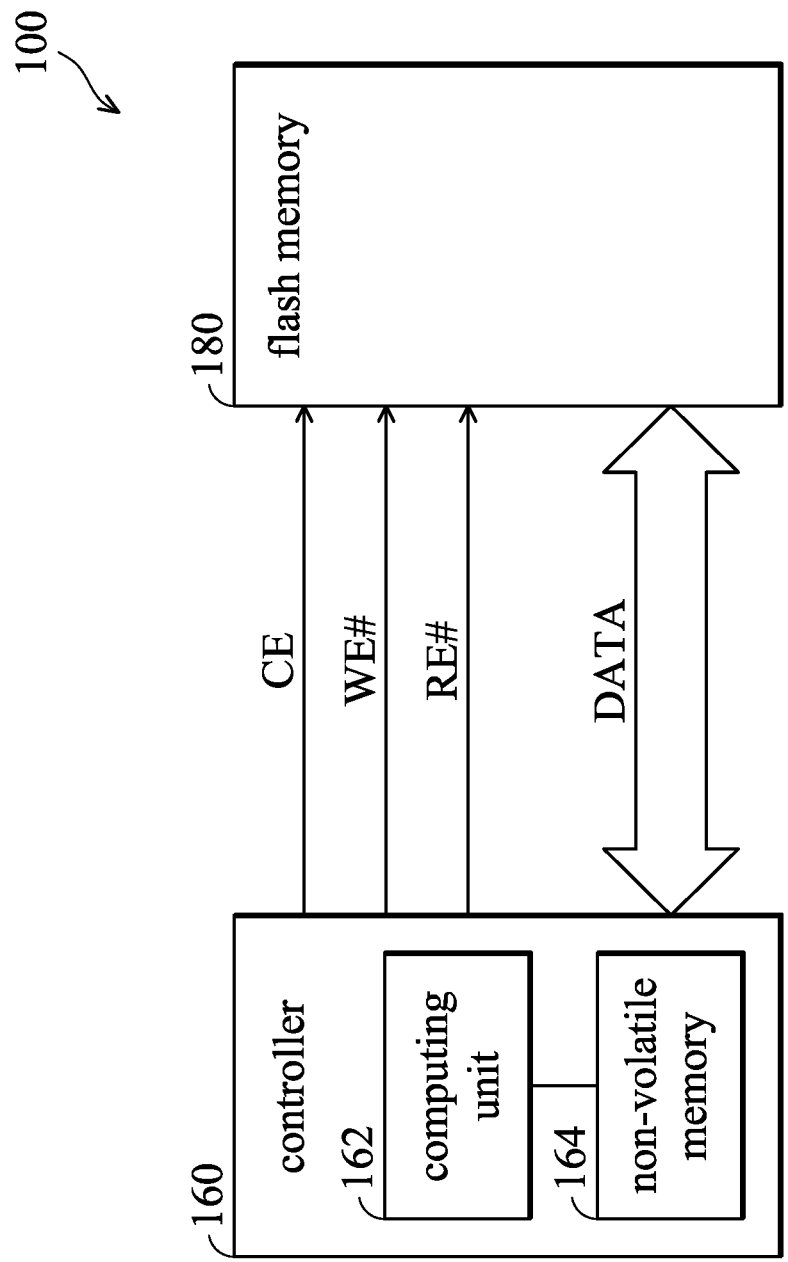
FIG. 1 is a schematic diagram illustrating an embodiment of a data storage device of the present disclosure.

FIG. 1 is a schematic diagram illustrating an embodiment of a data storage device of the present disclosure. The data storage device 100 includes a controller 160 and a flash memory 180. It should be noted that the data storage device 100 is capable of operating in an asynchronous mode (Asynchronous Mode/SDR Mode) and a detection mode. The controller 160 is arranged to transmit a plurality of enable signals to the flash memory 180. The enable signals may include the enable clock signal CE, the read-enable clock signal RE#, and the write-enable clock signal WE#, but it is not limited thereto. Moreover, a data line DATA is between the controller 160 and the flash memory 180. The data line DATA is arranged to transmit data. The controller 160 includes a computing unit 162 and a non-volatile memory (such as a read only memory ROM) 164. The program code and data stored in the non-volatile memory 164 may constitute firmware, and be performed by the computing unit 162, such that the controller 160 may control the flash memory 180 by the firmware. It should be noted that, in the present invention, the flash memory 180 is arranged to store a predetermined parameter. For example, the predetermined parameter is able to be saved to the flash memory while the flash memory is in production and arranged to determine the type of the flash memory 180, but it is not limited thereto.

The firmware disclosed by the present invention is arranged to enable the controller 160 to enable the flash memory 180 to operate in the mode-detection method for detecting whether the flash memory 180 supports a synchronous mode. The synchronous mode may be the ONFI DDR Mode or the ONFI Toggle Mode defined by the producer, but it is not limited thereto. For example, in the asynchronous mode, the controller 160 is arranged to enable the flash memory 180 to transmit the predetermined parameter to the controller 160 according to a first predetermined trigger edge of a clock signal, and read the predetermined parameter according to the first predetermined trigger edge of the clock signal to obtain a first reference parameter. Next, in the detection mode, the controller 160 enables the flash memory 180 to switch to the synchronous mode and transmit the predetermined parameter, and read the first predetermined trigger edge transmitted by the flash memory 180 according to the first predetermined trigger edge of the clock signal to obtain a second reference parameter. It should be noted that the controller 160 may read the predetermined parameter according to a read command in the asynchronous mode and the detection mode. For example, the read command may be a READ Command or a READ PARAMETER Command. Finally, the controller 160 is arranged to compare the first reference parameter with the second reference parameter for determining whether the flash memory 180 supports the synchronous mode. It should be noted that, if the flash memory 180 supports the synchronous mode, the flash memory 180 transmits the predetermined parameter to the controller 160 according to a second predetermined trigger edge of the clock signal after the controller 160 enables the flash memory 180 to switch to the synchronous mode, wherein the first predetermined trigger edge and the second predetermined trigger edge is different. If the flash memory 180 does not support the synchronous mode, the flash memory 180 transmits the predetermined parameter to the controller 160 according to the first predetermined trigger edge of the clock signal after the controller 160 enables the flash memory 180 to switch to the synchronous mode. Therefore, when the first reference parameter and the second reference parameter are equal, the controller 160 determines that the flash memory 180 does not support the synchronous mode. When the first reference parameter is different from the second reference parameter, the controller 160 determines that the flash memory 180 supports the synchronous mode. In one embodiment, the controller 160 may produce a determination signal according to the result and provide the determination signal to a host (not shown), such that the host may perform the corresponding operation according to the determination signal. For example, the host may display the result on an output device according to the determination signal. The output device may be a display device, a speaker or a light, but it is not limited thereto.

It should be noted that, when the flash memory 180 supports the synchronous mode and the data storage device 100 is in the synchronous mode, the controller 160 enables the flash memory 180 to transmit and write data according to the frequency of the second predetermined trigger edge of the clock signal. The controller 160 then reads the data transmitted by the flash memory 180 and writes data into the flash memory 180 according to the second predetermined trigger edge of the clock signal. Moreover, in one embodiment, the first predetermined trigger edge is the positive edge of the clock signal, and the second predetermined trigger edge includes both the positive edge and the negative edge of the clock signal. In another embodiment, the first predetermined trigger edge is the negative edge of the clock signal, and the second predetermined trigger edge includes the positive edge and the negative edge of the clock signal.

Namely, in one embodiment, data is arranged to be read from and written into the flash memory 180 bit by bit with the rate of the positive edge or the negative edge of the clock signal in the asynchronous mode, and data is arranged to be read from and written into the flash memory 180 bit by bit with the rate of the positive edge and the negative edge in the synchronous mode. Namely, the rate of reading and writing data in the synchronous mode is twice that of the asynchronous mode. Moreover, in the detection mode, the controller 160 reads the data received from the flash memory 180 at the rate of the asynchronous mode after the controller 160 enables the flash memory 180 to switch to the synchronous mode.

In one embodiment, the synchronous mode is a ONFI Toggle mode. In another embodiment, the synchronous mode is a ONFI DDR mode. It should be noted that, when the synchronous mode is the ONFI Toggle, the clock signal is a read-enable clock signal RE# arranged to be transmitted to the flash memory 180 from the controller 160. When the synchronous mode is the ONFI DDR mode, the clock signal is a write-enable clock signal WE# arranged to be transmitted to the flash memory 180 from the controller 160, but it is not limited thereto.

Figure 2:
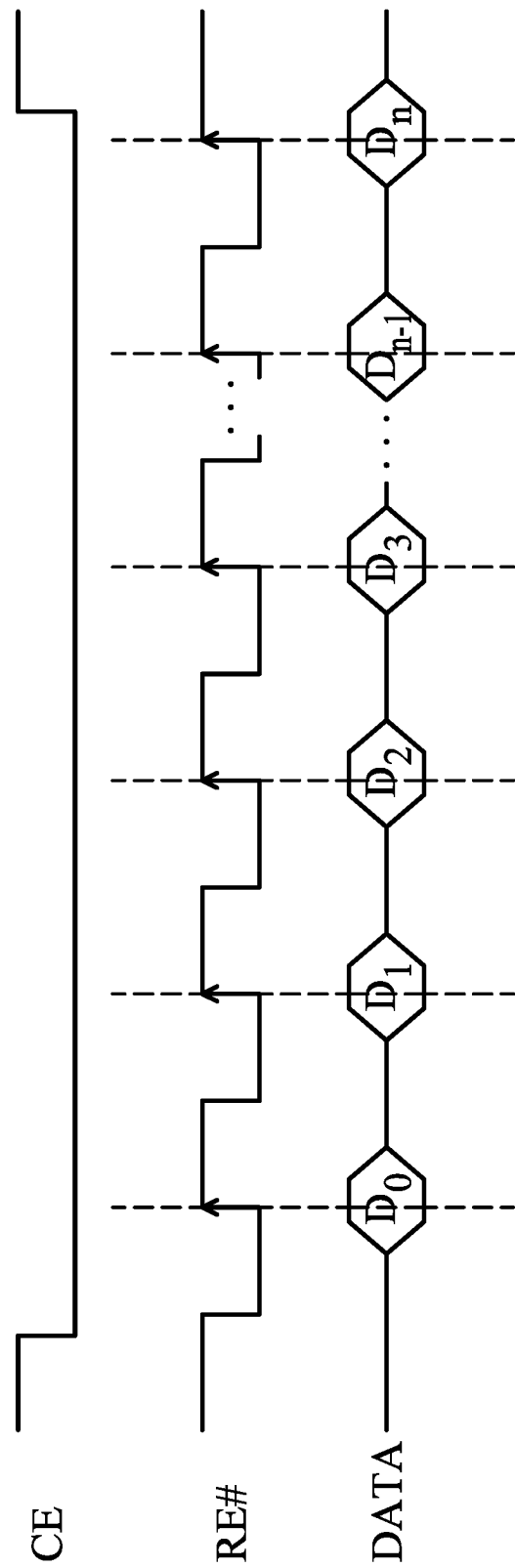
FIG. 2 is a signal diagram illustrating an embodiment of signals in an asynchronous mode of the present disclosure.

FIG. 2 is a signal diagram illustrating an embodiment of signals in an asynchronous mode of the present disclosure. In this embodiment, the clock signal is the read-enable clock signal RE# and the first predetermined trigger edge is the positive edge of the read-enable clock signal RE#. In the asynchronous mode, the controller 160 is arranged to enable the flash memory 180 to transmit the predetermined parameter $D_0$-$D_n$ according to the positive edge of the read-enable clock signal RE# through the data line DATA to the controller 160. Next, the controller 160 reads the predetermined parameter $D_0$-$D_n$ according to the positive edge of the read-enable clock signal RE# and takes the read predetermined parameter $D_0$-$D_n$ as the first reference parameter. It should be noted that, in one embodiment of the present invention, in the asynchronous mode, the controller 160 is arranged to read at least two data sectors $D_0$-$D_n$ of the predetermined parameter transmitted by the flash memory 180 according to the positive edge of the read-enable clock signal RE#, and take the at least two data sectors $D_0$-$D_n$ as the first reference parameter. For example, the controller 160 may read four data sectors $D_0$, $D_1$, $D_2$ and $D_3$ of the predetermined parameter $D_0$-$D_n$ transmitted by the flash memory 180 according to the positive edge of the read-enable clock signal RE#, and take the four data sectors $D_0$, $D_1$, $D_2$ and $D_3$ as the first reference parameter, but it is not limited thereto.

Figure 3:
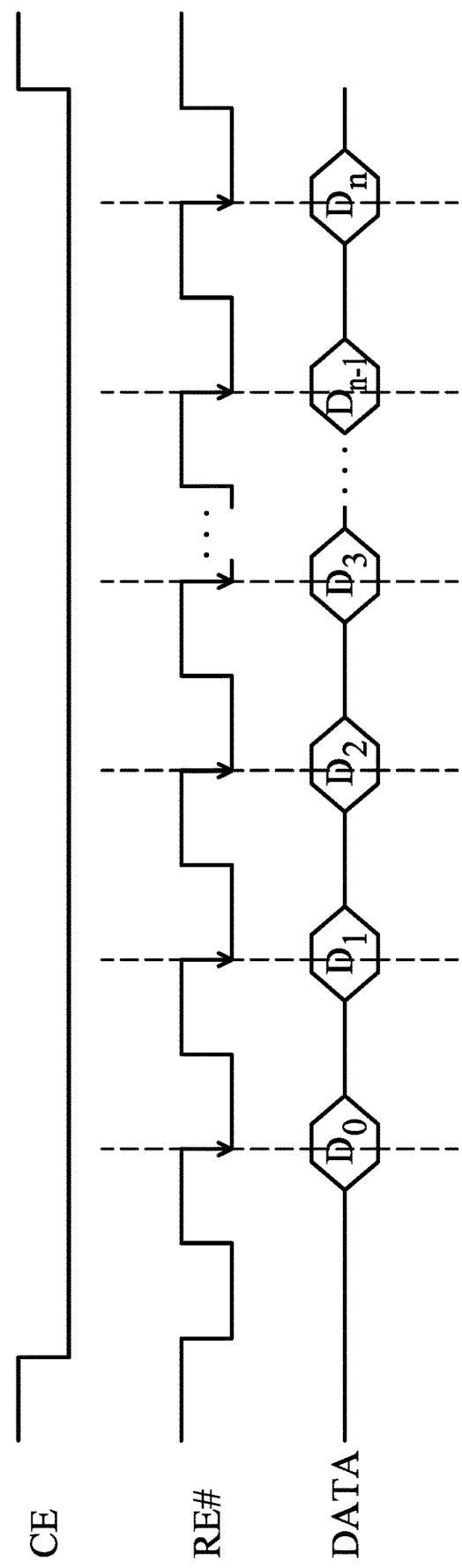
FIG. 3 is a signal diagram illustrating another embodiment of signals in the asynchronous mode of the present disclosure.

FIG. 3 is a signal diagram illustrating another embodiment of signals in the asynchronous mode of the present disclosure. In this embodiment, the clock signal is the read-enable clock signal RE#, and the first predetermined trigger edge is the negative edge of the read-enable clock signal RE#. In the asynchronous mode, the controller 160 is arranged to enable the flash memory 180 to transmit the predetermined parameter $D_0$-$D_n$ according to the negative edge of the read-enable clock signal RE# through the data line DATA to the controller 160. Next, in the asynchronous mode, the controller 160 reads the predetermined parameter $D_0$-$D_n$ transmitted by the flash memory 180 according to the negative edge of the read-enable clock signal RE# to obtain a first reference parameter. It should be noted that, in one embodiment of the present invention, in the asynchronous mode, the controller 160 reads the predetermined parameter $D_0$-$D_n$ transmitted with the negative edge of the read-enable clock signal RE# by the flash memory 180 according to the negative edge of the read-enable clock signal RE#, and take the read predetermined parameter $D_0$-$D_n$ as the first reference parameter. For example, the controller 160 may read four data sectors $D_0$, $D_1$, $D_2$ and $D_3$ of the predetermined parameter transmitted with the negative edge of the read-enable clock signal RE# by the flash memory 180, and take the four data sectors $D_0$, $D_1$, $D_2$ and $D_3$ as the first reference parameter, but it is not limited thereto.

Figure 4:
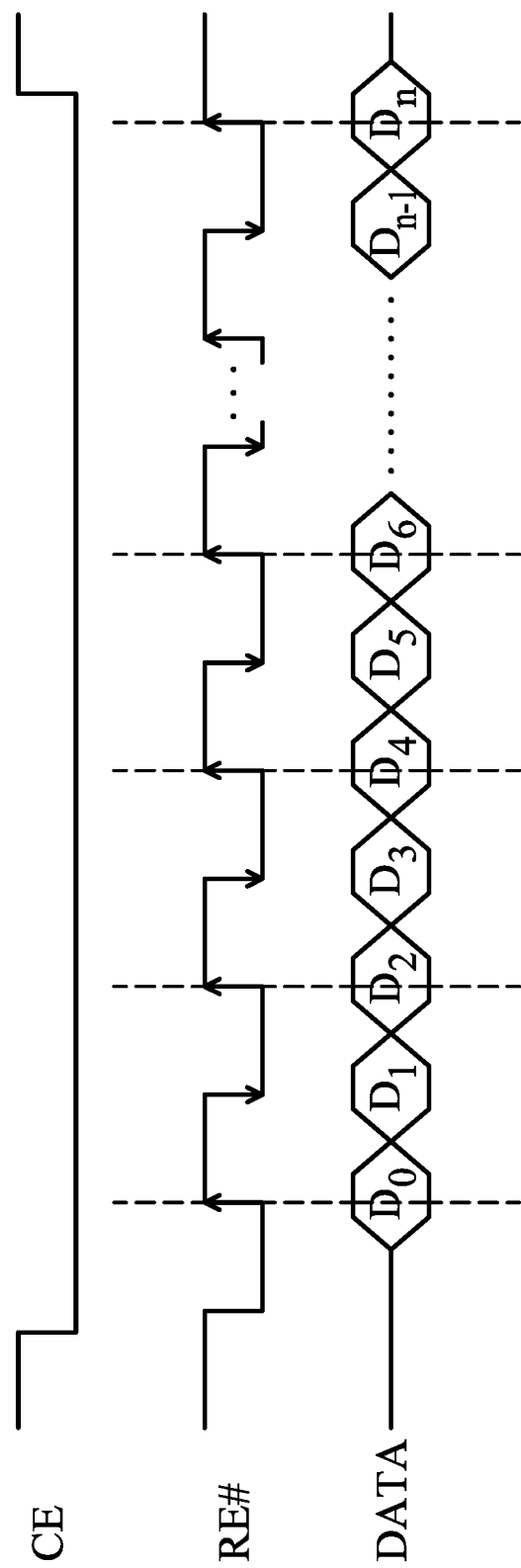
FIG. 4 is a signal diagram illustrating an embodiment of signals in a detection mode of the present disclosure.

Next, as shown in FIG. 4, FIG. 4 is a signal diagram illustrating an embodiment of signals in a detection mode of the present disclosure. In this embodiment, the synchronous mode is the ONFI Toggle mode, the clock signal is the read-enable clock signal RE#, the first predetermined trigger edge is the positive edge of the read-enable clock signal RE#, the second predetermined trigger edge includes both the positive edge and the negative edge of the read-enable clock signal RE#, and the flash memory 180 supports the synchronous mode. In the detection mode, the controller 160 enables the flash memory 180 to be switched to the synchronous mode and to transmit the predetermined parameter $D_0$-$D_n$ to the controller 160. It should be noted that, in this embodiment, the flash memory 180 supports the synchronous mode, such that the flash memory 180 can transmit the predetermined parameter $D_0$-$D_n$ according to both the positive edge and the negative edge of the read-enable clock signal RE# to the controller 160 after the controller 160 enables the flash memory 180 to switch to the synchronous mode. Moreover, the controller 160 reads the predetermined parameter according to the positive edge of the read-enable clock signal RE# to obtain a second reference parameter. It should be noted that, in one embodiment, in the detection mode, the controller 160 reads at least two data sectors of the predetermined parameter $D_0$-$D_n$ transmitted with both the positive edge and the negative edge of the read-enable clock signal RE# by the flash memory 180 according to the positive edge of the read-enable clock signal RE#, and takes the read least two data sectors as the second reference parameter. Namely, in the detection mode, the controller 160 reads the predetermined parameter $D_0$-$D_n$ transmitted by the flash memory 180 at the rate of the asynchronous mode after the controller 160 enables the flash memory 180 to switch to the synchronous mode. For example, the controller 160 reads four data sectors $D_0$, $D_2$, $D_4$ and $D_6$ of the predetermined parameter transmitted with both the positive edge and the negative edge of the read-enable clock signal RE# by the flash memory 180 according to the positive edge of the read-enable clock signal RE#, and take the four data sectors $D_0$, $D_2$, $D_4$ and $D_6$ as the second reference parameter, but it is not limited thereto. It should be noted that, in one embodiment of the present invention, the flash memory 180 supports the synchronous mode, such that the first reference parameter constituted by $D_0$, $D_1$, $D_2$ and $D_3$ and read by the controller 160 in the asynchronous mode is different from the second reference parameter constituted by $D_0$, $D_2$, $D_4$ and $D_6$ and read by the controller 160 in the detection mode.

Figure 5:
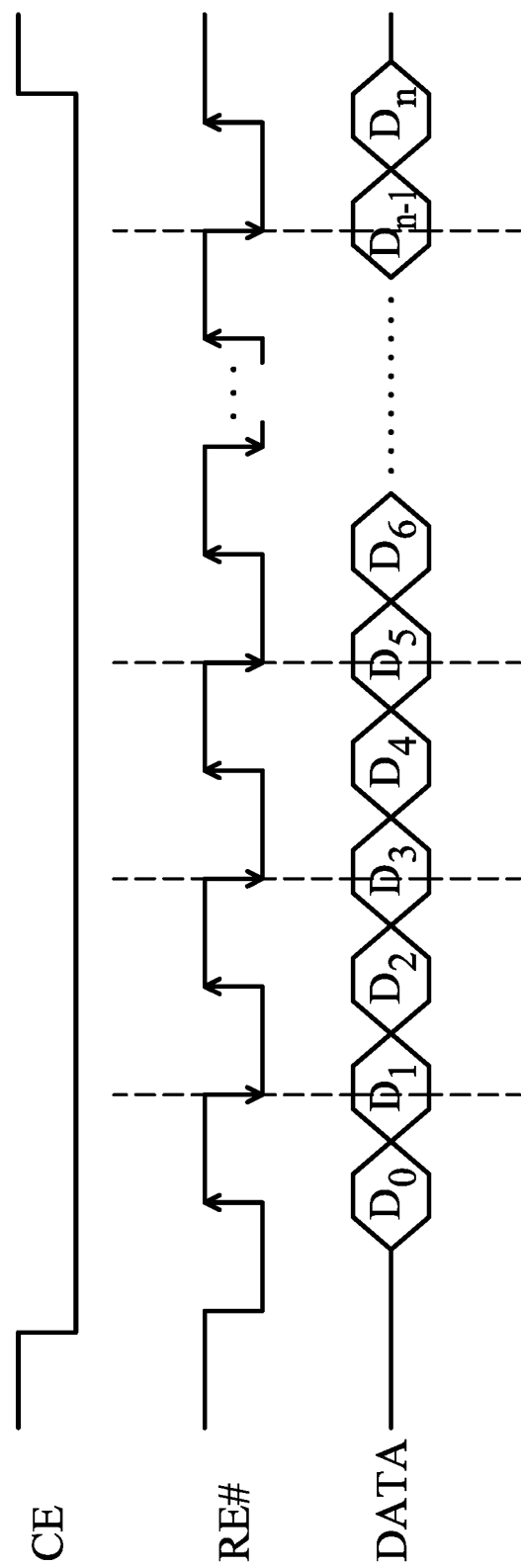
FIG. 5 is a signal diagram illustrating another embodiment of signals in the detection mode of the present disclosure.

FIG. 5 is a signal diagram illustrating another embodiment of signals in the detection mode of the present disclosure. In this embodiment, the synchronous mode is the ONFI Toggle mode, the clock signal is the read-enable clock signal RE#, the first predetermined trigger edge is the negative edge of the read-enable clock signal RE#, the second predetermined trigger edge includes both the positive edge and the negative edge of the read-enable clock signal RE#, and the flash memory 180 supports the synchronous mode. In the detection mode, the controller 160 enables the flash memory 180 to switch to the synchronous mode and transmit the predetermined parameter $D_0$-$D_n$ to the controller 160. It should be noted that, in this embodiment, the flash memory 180 supports the synchronous mode, such that the flash memory 180 can transmit the predetermined parameter $D_0$-$D_n$ according to both the positive edge and the negative edge of the read-enable clock signal RE# to the controller 160 through the data line DATA after the controller 160 enables the flash memory 180 to switch to the synchronous mode. Moreover, the controller 160 reads the predetermined parameter according to the negative edge of the read-enable clock signal RE# to obtain a second reference parameter. It should be noted that, in one embodiment of the present invention, the controller 160 is arranged to read at least two data sectors of the predetermined parameter $D_0$-$D_n$ transmitted with both the positive edge and the negative edge of the read-enable clock signal RE# by the flash memory 180 according to the negative edge of the read-enable clock signal RE# in the detection mode, and take the read at least two data sectors as the second reference parameter. Namely, in the detection mode, the controller 160 reads the predetermined parameter $D_0$-$D_n$ transmitted by the flash memory 180 at the rate of the asynchronous mode after the controller 160 enables the flash memory 180 to switch to the synchronous mode. For example, the controller 160 may read the data sectors $D_1$, $D_3$, $D_5$ and $D_7$ of the predetermined parameter transmitted with the negative edge and the positive edge of the read-enable clock signal RE# by the flash memory 180 according to the negative edge of the read-enable clock signal RE#, and take the data sectors $D_1$, $D_3$, $D_5$ and $D_7$ of the predetermined parameter as the second reference parameter, but it is not limited thereto. It should be noted that, in one embodiment of the present invention, the flash memory 180 supports the synchronous mode, such that the first reference parameter constituted by $D_0$, $D_1$, $D_2$ and $D_3$ and read by the controller 160 in the asynchronous mode is different from the second reference parameter constituted by $D_1$, $D_3$, $D_5$ and $D_7$ and read by the controller 160 in the detection mode.

Figure 6:
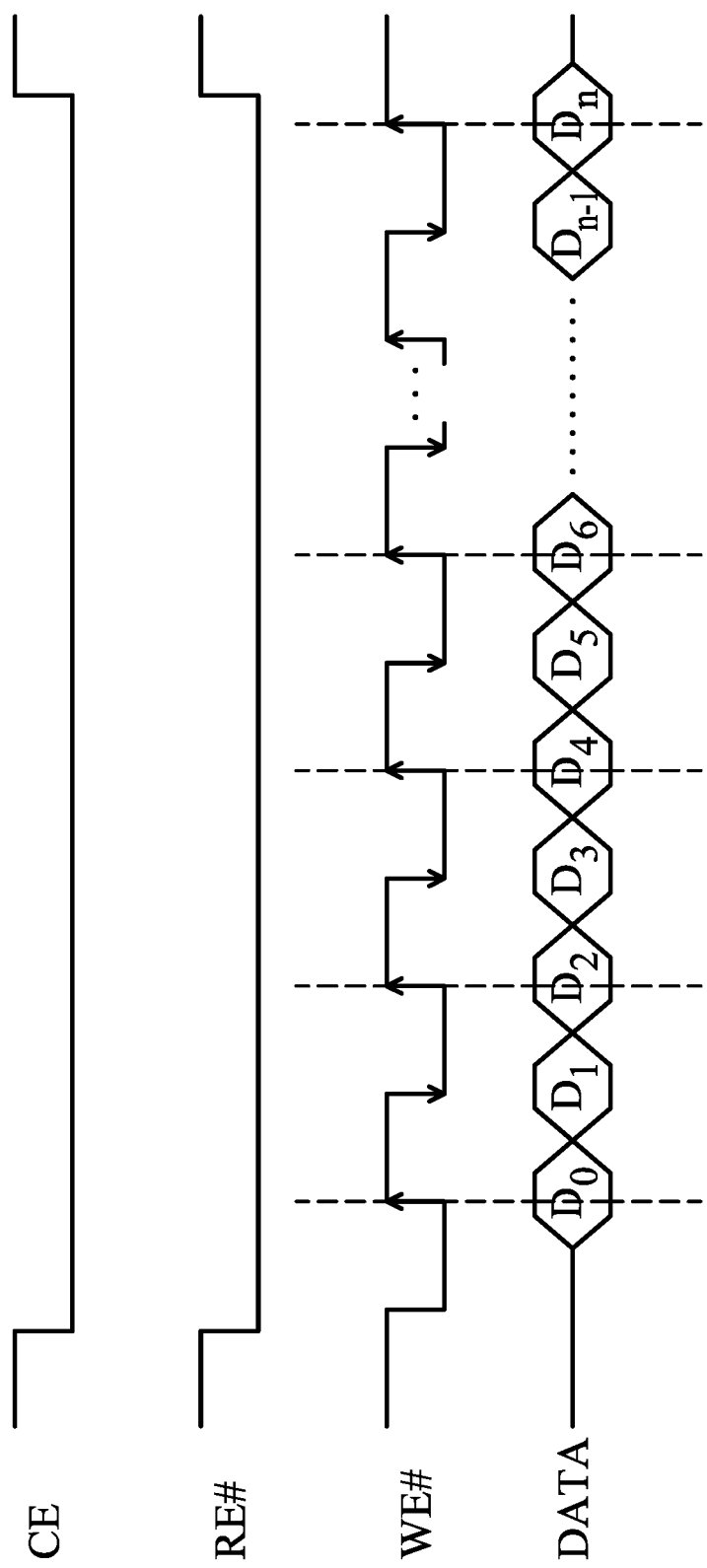
FIG. 6 is a signal diagram illustrating another embodiment of signals in the detection mode of the present disclosure.

FIG. 6 is a signal diagram illustrating another embodiment of signals in the detection mode of the present disclosure. In this embodiment, the synchronous mode is the ONFI DDR mode, the clock signal is the write-enable clock signal WE#, the first predetermined trigger edge is the positive edge of the write-enable clock signal WE#, the second predetermined trigger edge includes both the positive edge and the negative edge of the write-enable clock signal WE#, and the flash memory 180 supports the synchronous mode. In the detection mode, the controller 160 enables the flash memory 180 to switch to the synchronous mode and transmit the predetermined parameter $D_0$-$D_n$ to the controller. It should be noted that, in this embodiment, the flash memory 180 supports the synchronous mode, such that the flash memory 180 can transmit the predetermined parameter $D_0$-$D_n$ according to both the positive edge and the negative edge of the write-enable clock signal WE# to the controller 160 through the data line DATA after the controller 160 enables the flash memory 180 to switch to the synchronous mode. Moreover, the controller 160 reads the predetermined parameter according to the positive edge of the write-enable clock signal WE# to obtain a second reference parameter. It should be noted that, in one embodiment, in the detection mode, the controller 160 reads the at least two data sectors of the predetermined parameter $D_0$-$D_n$ transmitted with both the positive edge and the negative edge of the write-enable clock signal WE# by the flash memory 180 according to the positive edge of the write-enable clock signal WE#, and take the read least two data sectors as the second reference parameter. Namely, in the detection mode, the controller 160 reads the predetermined parameter $D_0$-$D_n$ transmitted by the flash memory 180 at the rate of the asynchronous mode after the controller 160 enables the flash memory 180 to switch to the synchronous mode. For example, the controller 160 reads four data sectors $D_0$, $D_2$, $D_4$ and $D_6$ of the predetermined parameter transmitted with both the positive edge and the negative edge of the write-enable clock signal WE# by the flash memory 180 according to the positive edge of the write-enable clock signal WE#, and take the four data sectors $D_0$, $D_2$, $D_4$ and $D_6$ as the second reference parameter, but it is not limited thereto. It should be noted that, in one embodiment of the present invention, the flash memory 180 supports the synchronous mode, such that the first reference parameter constituted by $D_0$, $D_1$, $D_2$ and $D_3$ and read by the controller 160 in the asynchronous mode is different from the second reference parameter constituted by $D_0$, $D_2$, $D_4$ and $D_6$ and read by the controller 160 in the detection mode.

Figure 7:
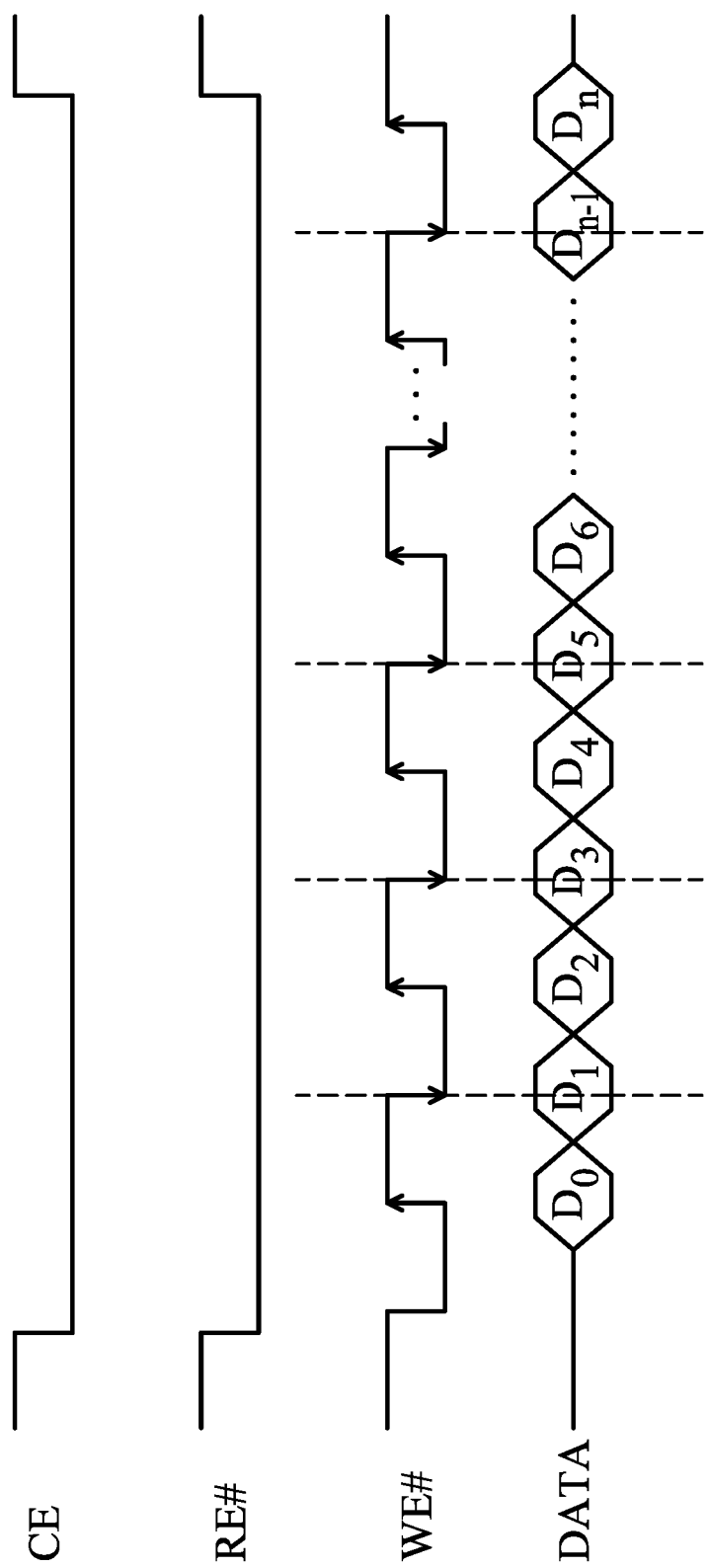
FIG. 7 is a signal diagram illustrating another embodiment of signals in the detection mode of the present disclosure.

FIG. 7 is a signal diagram illustrating another embodiment of signals in the detection mode of the present disclosure. In this embodiment, the synchronous mode is the ONFI DDR mode, the clock signal is the write-enable clock signal WE#, the first predetermined trigger edge is the negative edge of the write-enable clock signal WE#, the second predetermined trigger edge includes both the positive edge and the negative edge of the write-enable clock signal WE#, and the flash memory 180 supports the synchronous mode. In the detection mode, the controller 160 enables the flash memory 180 to switch to the synchronous mode and transmit the predetermined parameter $D_0$-$D_n$ to the controller 160. It should be noted that, in this embodiment, the flash memory 180 supports the synchronous mode, such that the flash memory 180 can transmit the predetermined parameter $D_0$-$D_n$ according to both the positive edge and the negative edge of the write-enable clock signal WE# to the controller 160 through the data line DATA after the controller 160 enables the flash memory 180 to switch to the synchronous mode. Moreover, the controller 160 reads the predetermined parameter according to the negative edge of the write-enable clock signal WE# to obtain a second reference parameter. It should be noted that, in one embodiment of the present invention, the controller 160 is arranged to read at least two data sectors of the predetermined parameter $D_0$-$D_n$ transmitted with both the positive edge and the negative edge of the write-enable clock signal WE# by the flash memory 180 according to the negative edge of the write-enable clock signal WE# in the detection mode, and take the read at least two data sectors as the second reference parameter. Namely, in the detection mode, the controller 160 reads the predetermined parameter $D_0$-$D_n$ transmitted by the flash memory 180 at the rate of the asynchronous mode after the controller 160 enables the flash memory 180 to switch to the synchronous mode. For example, the controller 160 may read the data sectors $D_1$, $D_3$, $D_5$ and $D_7$ of the predetermined parameter transmitted with the negative edge and the positive edge of the write-enable clock signal WE# by the flash memory 180 according to the negative edge of the write-enable clock signal WE#, and take the data sectors $D_1$, $D_3$, $D_5$ and $D_7$ of the predetermined parameter as the second reference parameter, but it is not limited thereto. It should be noted that, in one embodiment of the present invention, the flash memory 180 supports the synchronous mode, such that the first reference parameter constituted by $D_0$, $D_1$, $D_2$ and $D_3$ and read by the controller 160 in the asynchronous mode is different from the second reference parameter constituted by $D_1$, $D_3$, $D_5$ and $D_7$ and read by the controller 160 in the detection mode.

When the flash memory 180 does not support the synchronous mode, the flash memory 180 cannot transmit the predetermined parameter $D_0$-$D_n$ according to both the positive edge and the negative edge of the read-enable clock signal RE# after the controller 160 enables the flash memory 180 to switch to the synchronous mode. Namely although the controller 160 has enabled the flash memory 180 to switch in the synchronous mode, the flash memory 180 can only transmit the predetermined parameter $D_0$-$D_n$ according to the positive edge of the read-enable clock signal RE# or the negative edge of the read-enable clock signal RE#. Therefore, the signal diagram produced by the data storage device 100 is same as FIG. 2 or FIG. 3 when the flash memory 180 does not support the synchronous mode. Namely, the first reference parameter and the second reference parameter are the same. In one embodiment of the present invention, the flash memory 180 does not support the synchronous mode, such that the first reference parameter constituted by $D_0$, $D_1$, $D_2$ and $D_3$ and read by the controller 160 in the asynchronous mode is same as the second reference parameter constituted by $D_0$, $D_1$, $D_2$ and $D_3$ and read by the controller 160 in the detection mode. Therefore, the controller 160 can determine whether the flash memory 180 supports the synchronous mode by comparing the first reference parameter with the second reference parameter.

Figure 8:
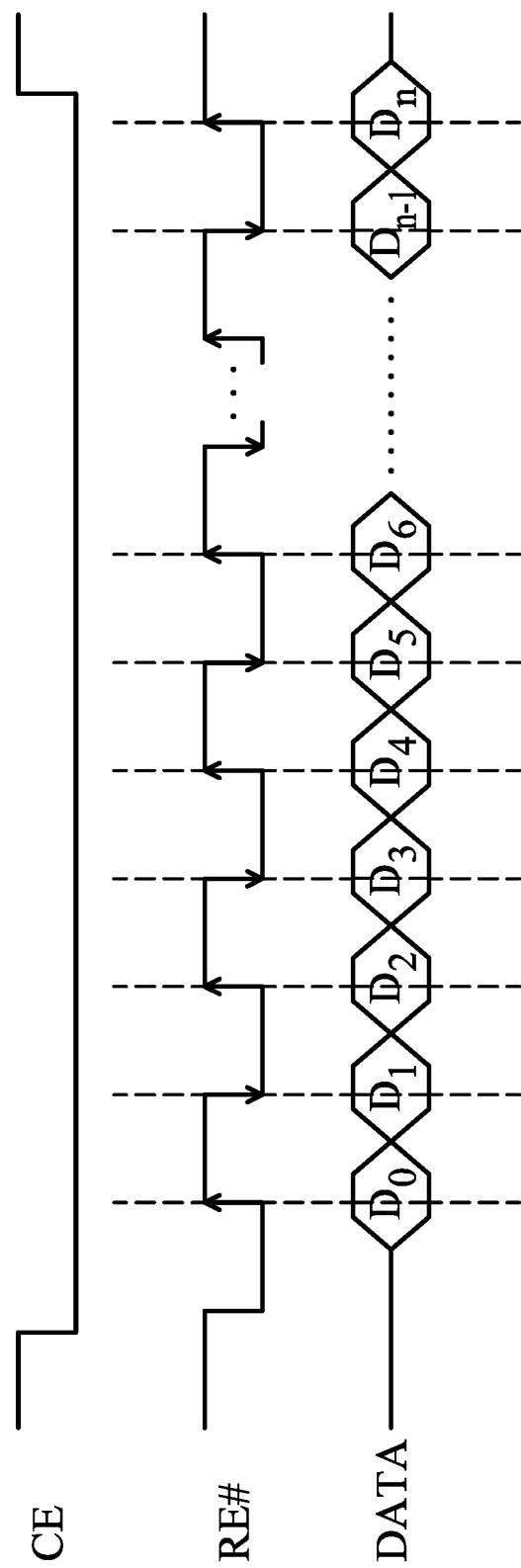
FIG. 8 is a signal diagram illustrating an embodiment of signals in a synchronous mode of the present disclosure.

FIG. 8 is a signal diagram illustrating an embodiment of signals in a synchronous mode of the present disclosure. In this embodiment, the synchronous mode is the ONFI Toggle mode, the clock signal is the read-enable clock signal RE#, the second predetermined trigger edge includes both the positive edge and the negative edge of the read-enable clock signal RE#, and the flash memory 180 supports the synchronous mode. When the data storage device 100 is in the synchronous mode, the controller 160 enables the flash memory 180 to transmit data through the data line DATA according to both the positive edge and the negative edge of the read-enable clock signal RE#. Moreover, the controller 160 reads the data transmitted by the flash memory 180 according to both the positive edge and the negative edge of the read-enable clock signal RE#.

Figure 9:
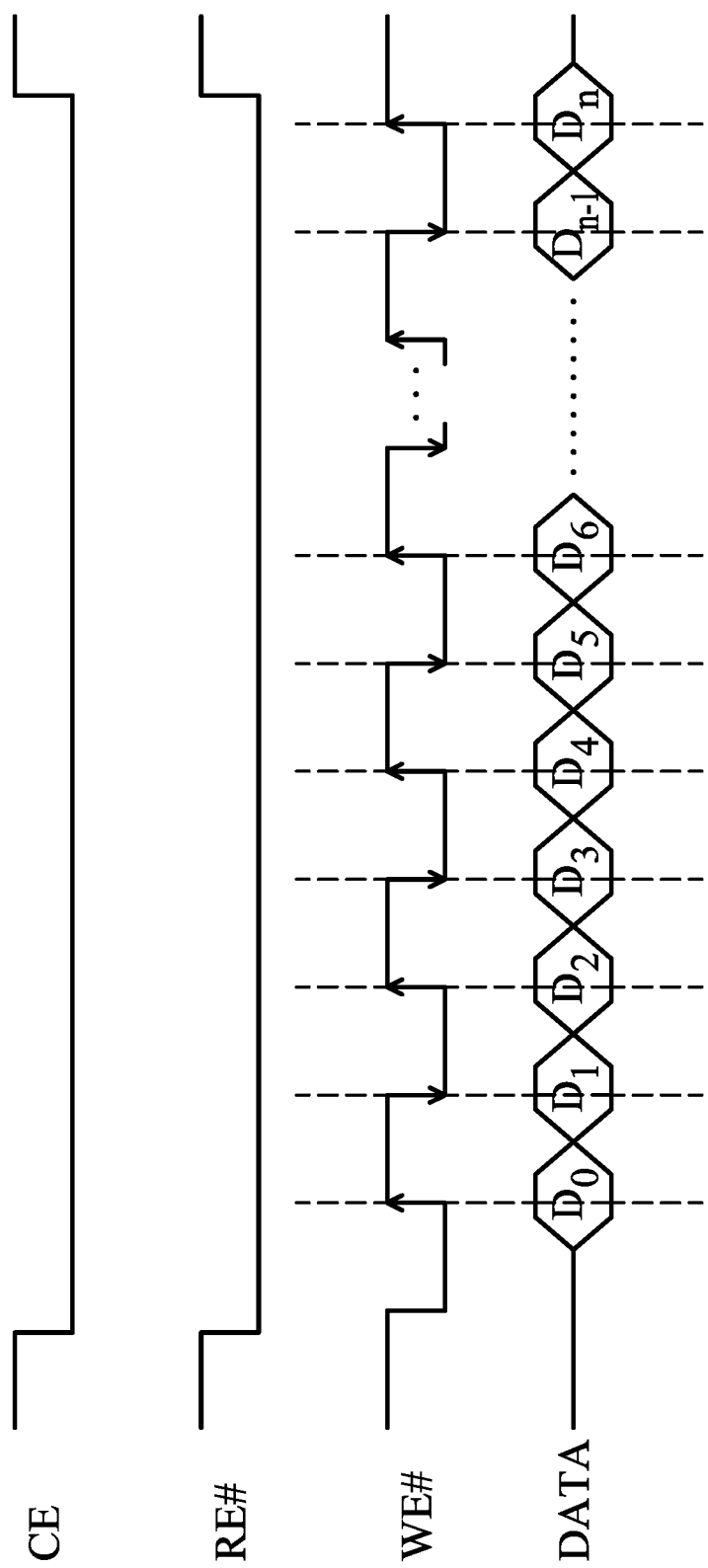
FIG. 9 is a signal diagram illustrating another embodiment of signals in the synchronous mode of the present disclosure.

FIG. 9 is a signal diagram illustrating another embodiment of signals in the synchronous mode of the present disclosure. In this embodiment, the synchronous mode is the ONFI DDR mode, the clock signal is the write-enable clock signal WE#, the second predetermined trigger edge includes both the positive edge and the negative edge of the write-enable clock signal WE#, and the flash memory 180 supports the synchronous mode. When the data storage device 100 operates in the synchronous mode, the controller 160 enables the flash memory 180 to transmit data through the data line DATA according to both the positive edge and the negative edge of the write-enable clock signal WE#. Moreover, the controller 160 reads the data transmitted by the flash memory 180 according to both the positive edge and the negative edge of the write-enable clock signal WE#.

Figure 10:
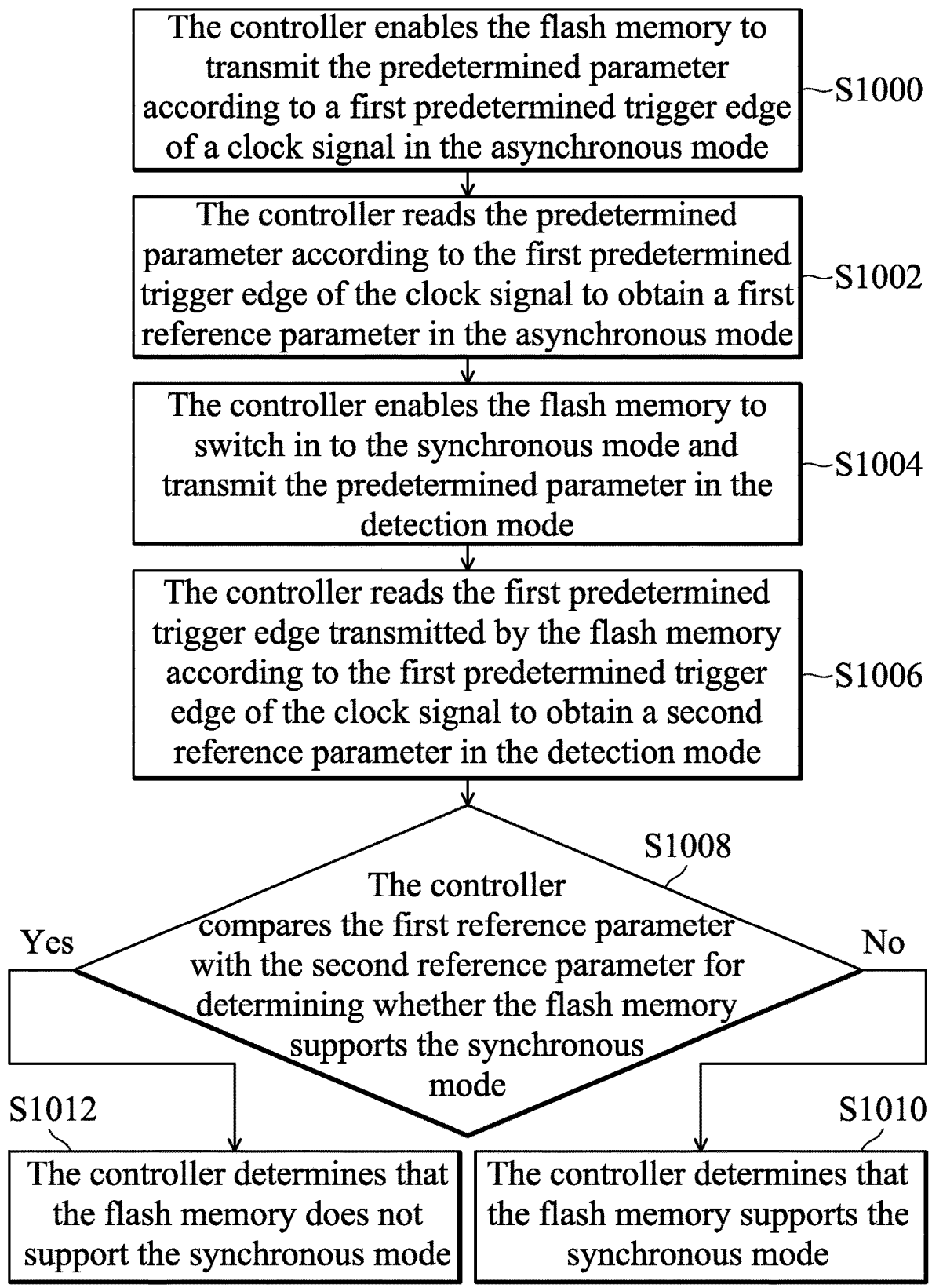
FIG. 10 is a flowchart of mode-detection method according to another embodiment of the present disclosure.

FIG. 10 is a flowchart of a mode-detection method according to another embodiment of the present disclosure. The mode-detection method is applied to the data storage device 100 of FIG. 1. The process starts at step S1000.

In step S1000, the controller 160 is arranged to enable the flash memory 180 to transmit the predetermined parameter to the controller 160 according to a first predetermined trigger edge of a clock signal in the asynchronous mode. It should be noted that, in this embodiment, the flash memory 180 is arranged to store the predetermined parameter. For example, the predetermined parameter is able to be saved into the flash memory while the flash memory is in production and arranged to determine the type of the flash memory 180, but it is not limited thereto. In another embodiment, the first predetermined trigger edge is the positive edge of the clock signal.

Next, in step S1002, the controller 160 is arranged to read the predetermined parameter according to the first predetermined trigger edge of the clock signal to obtain a first reference parameter in the asynchronous mode. It should be noted that the controller 160 may read the predetermined parameter according to a read command in the asynchronous mode and the detection mode. For example, the read command may be a READ Command or a READ PARAMETER Command. Moreover, in one embodiment, the controller 160 is arranged to read at least two data sectors of the predetermined parameter transmitted with the first predetermined trigger edge of the clock signal by the flash memory 180 according to the first predetermined trigger edge of the clock signal, and take the read at least one data sectors as the first reference parameter. For example, the controller 160 reads four data sectors of the predetermined parameter transmitted with the first predetermined trigger edge of the clock signal by the flash memory 180 according to the first predetermined trigger edge of the clock signal, and take the read four data sector as the first reference parameter. The details can be referred to in FIG. 2 and FIG. 3.

In step S1004, in the detection mode, the controller 160 enables the flash memory to switch to the synchronous mode and transmit the predetermined parameter to the controller 160. In one embodiment, the synchronous mode is the ONFI Toggle mode. In another embodiment, the synchronous mode is the ONFI DDR mode. It should be noted that, if the flash memory 180 supports the synchronous mode, the flash memory 180 transmits the predetermined parameter to the controller 160 according to a second predetermined trigger edge of the clock signal after the controller 160 enables the flash memory 180 to switch to the synchronous mode, wherein the first predetermined trigger edge and the second predetermined trigger edge is different. If the flash memory 180 does not support the synchronous mode, the flash memory 180 transmits the predetermined parameter to the controller 160 according to the first predetermined trigger edge of the clock signal after the controller 160 enables the flash memory 180 to switch to the synchronous mode. When the synchronous mode is the ONFI Toggle mode, the clock signal is the read-enable clock signal RE# arranged to be transmitted to the flash memory 180 from the controller 160. When the synchronous mode is the ONFI DDR mode, the clock signal is the write-enable clock signal WE# arranged to be transmitted to the flash memory 180 from the controller 160, but it is not limited thereto. Moreover, the first predetermined trigger edge is the positive edge of the clock signal or the negative edge of the clock signal, and the second predetermined trigger edge includes both the positive edge and the negative edge of the clock signal.

In step S1006, in the detection mode, the controller 160 reads the first predetermined trigger edge transmitted by the flash memory 180 according to the first predetermined trigger edge of the clock signal to obtain a second reference parameter. It should be noted that the controller 160 may read the predetermined parameter according to a read command in the asynchronous mode and the detection mode. For example, the read command may be a READ Command or a READ PARAMETER Command. In one embodiment, the controller 160 is arranged to read at least to data sectors D0-Dn of the predetermined parameter transmitted by the flash memory 180 according to the second predetermined trigger edge of the clock signal, and take the read data sectors as the second reference parameter. For example, the controller 160 may read four data sectors of the predetermined parameter transmitted by the flash memory 180 according to the second predetermined trigger edge of the clock signal, and take the read four data sectors as the second reference parameter. The details may be referred to FIGS. 4-7, but it is not limited thereto.

In step S1008, the controller 160 is arranged to compare the first reference parameter with the second reference parameter for determining whether the flash memory 180 supports the synchronous mode. When the first reference parameter and the second reference parameter are equal, the process goes to step S1012, otherwise, the process goes to step S1010.

In step S1010, the controller 160 determines that the flash memory 180 supports the synchronous mode. The process ends at step S1010. It should be noted that, when the flash memory 180 supports the synchronous mode and the data storage device 100 operates in the synchronous mode, the controller 160 enables the flash memory 180 to transmit and write data according to the frequency of the second predetermined trigger edge of the clock signal, and reads the data transmitted by the flash memory 180 and write data into the flash memory 180 according to the second predetermined trigger edge of the clock signal. Moreover, the first predetermined trigger edge is the positive edge of the clock signal or the negative edge of the clock signal, the second predetermined trigger edge includes both the positive edge and the negative edge of the clock signal. The flash memory 180 is accessed by the frequency of the positive edge or the negative edge of the clock signal in the asynchronous mode, and the flash memory 180 is accessed by the frequency of both the positive edge and the negative edge of the clock signal. The details may be referred to in FIGS. 8-9.

In step S1012, the controller 160 determines that the flash memory 180 does not support the synchronous mode. The process ends at step S1012. In one embodiment, the controller 160 may produce a determination signal according to the result and provide the determination signal to a host (not shown), such that the host may perform the corresponding operation according to the determination signal. For example, the host may display the result on an output device according to the determination signal. The output device may be a display device, a speaker or a light, but it is not limited thereto.

The data storage device 100 and the mode-detection method of the present invention are capable of determining whether the data storage device 100 supports the synchronous mode by comparing the predetermined parameters read in the asynchronous mode and the detection mode.

Data transmission methods, or certain aspects or portions thereof, may take the form of program code (i.e., executable instructions) embodied in tangible media, such as floppy diskettes, CD-ROMS, hard drives, or any other machinereadable storage medium, wherein, when the program code is loaded into and executed by a machine such as a computer, the machine thereby becomes an apparatus for practicing the methods. The methods may also be embodied in the form of program code transmitted over some transmission medium, such as electrical wiring or cabling, through fiber optics, or via any other form of transmission, wherein, when the program code is received and loaded into and executed by a machine such as a computer, the machine becomes an apparatus for practicing the disclosed methods. When implemented on a general-purpose processor, the program code combines with the processor to provide a unique apparatus that operates analogously to application-specific logic circuits.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A mode-detection method executed by a controller of a data storage device, comprising:
   issuing a CE signal to a Flash memory of the data storage device;
   issuing a read command to the Flash memory in order to receive a first data corresponding to a stored data in an asynchronous mode;
   enabling the Flash memory to switch from the asynchronous mode to a synchronous mode;
   issuing the read command to the Flash memory in order to receive a second data corresponding to the stored data;
   determining whether the first data is different from the second data; and
   if the determination is positive, operating the Flash memory in the synchronous mode.

2. The mode-detection method as claimed in claim 1, wherein the asynchronous mode is a SDR or non-Toggle mode.

3. The mode-detection method as claimed in claim 1, wherein the synchronous mode is a DDR or Toggle mode.

4. The mode-detection method as claimed in claim 1, wherein the read command is a read parameter command.

5. The mode-detection method as claimed in claim 1, wherein the stored data is a default parameter.

6. A mode-detection method executed by a controller of a data storage device, comprising:
   selecting a Flash memory of the data storage device via a signal CE;
   issuing a read command to the Flash memory;
   reading a first data from the Flash memory corresponding to the read command at a predetermined trigger edge;
   switching the Flash memory to a synchronous mode;
   reading a second data from the Flash memory corresponding to the read command at the predetermined trigger edge;
   determining whether the first data is different from the second data; and
   if the determination is positive, operating the Flash memory in the synchronous mode.

7. The mode-detection method as claimed in claim 6, wherein the asynchronous mode is a SDR or non-Toggle mode.

8. The mode-detection method as claimed in claim 6, wherein the synchronous mode is a DDR or Toggle mode.

9. The mode-detection method as claimed in claim 6, wherein the read command is a read parameter command.

10. The mode-detection method as claimed in claim 6, wherein the stored data is a default parameter.

11. The mode-detection method as claimed in claim 6, wherein the first data and the second data is read at the predetermined trigger edge of a read-enable clock signal RE#.

12. The mode-detection method as claimed in claim 11, wherein the predetermined trigger edge is either a positive or a negative edge.

* * * * *